(12) United States Patent
Alasiri et al.

(10) Patent No.: US 12,503,415 B2
(45) Date of Patent: Dec. 23, 2025

(54) PROCESS FOR SEPARATING 1-BUTENE FROM C4 RAFFINATE GAS COMPOSITION

(71) Applicant: KING FAHD UNIVERSITY OF PETROLEUM AND MINERALS, Dhahran (SA)

(72) Inventors: Hassan S. Alasiri, Dhahran (SA); Ziyauddin S. Qureshi, Dhahran (SA); Faizur Rahman, Dhahran (SA); Uwais Baduruthamal, Dhahran (SA); Mohammad Ahmed Al-Yami, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 173 days.

(21) Appl. No.: 18/449,380

(22) Filed: Aug. 14, 2023

(65) Prior Publication Data

US 2025/0059113 A1    Feb. 20, 2025

(51) Int. Cl.
*C07C 7/13* (2006.01)
*B01J 20/18* (2006.01)
(Continued)

(52) U.S. Cl.
CPC .................. *C07C 7/13* (2013.01); *B01J 20/18* (2013.01); *B01J 20/28061* (2013.01);
(Continued)

(58) Field of Classification Search
CPC .... C07C 7/11; C07C 7/12; C07C 7/13; C07C 11/08; B01J 20/18; B01J 20/28061;
(Continued)

(56) References Cited

U.S. PATENT DOCUMENTS

| 3,785,122 A | 1/1974 | Yatsurugi et al. |
| 3,982,912 A | 9/1976 | Yatsurugi et al. |

(Continued)

FOREIGN PATENT DOCUMENTS

| CN | 102329179 A | 1/2012 |
| WO | WO-2021161170 A1 * | 8/2021 |

OTHER PUBLICATIONS

Joel Padin, et al., "New Sorbents for Olefin/Paraffin Separations and Olefin Purification for C4 Hydrocarbons", Industrial & Engineering Chemistry Research, vol. 38, Issue 10, Apr. 27, 1999, pp. 3614-3621 (Abstract only).

(Continued)

*Primary Examiner* — In Suk C Bullock
*Assistant Examiner* — Jason Y Chong
(74) *Attorney, Agent, or Firm* — Oblon, McClelland, Maier & Neustadt, L.L.P.

(57) ABSTRACT

A process for separating 1-butene from a C4 raffinate gas composition includes introducing the C4 raffinate gas composition to a reactor containing an adsorbent material and passing the C4 raffinate gas composition through the adsorbent material; adsorbing the 1-butene from the C4 raffinate gas composition onto the adsorbent material to separate the 1-butene from the C4 raffinate gas composition and form a residue gas composition; and desorbing the 1-butene by heating the adsorbent material after the adsorbing to form the 1-butene and regenerate the adsorbent material. The adsorbent material is at least one of a zeolite adsorbent and an alkali-modified zeolite adsorbent having at least 99% by weight selective towards 1-butene for adsorption in comparison to iso-butene and iso-butane.

20 Claims, 7 Drawing Sheets

(51) Int. Cl.
  *B01J 20/28* (2006.01)
  *B01J 20/30* (2006.01)
  *C07C 11/08* (2006.01)

(52) U.S. Cl.
  CPC ..... *B01J 20/2808* (2013.01); *B01J 20/28083* (2013.01); *B01J 20/3078* (2013.01); *C07C 11/08* (2013.01); *B01J 20/28064* (2013.01); *B01J 20/28073* (2013.01); *B01J 2220/56* (2013.01)

(58) Field of Classification Search
  CPC ............ B01J 20/28064; B01J 20/28073; B01J 20/28083; B01J 20/28085; B01J 20/3078; B01J 2220/56
  See application file for complete search history.

(56) References Cited

U.S. PATENT DOCUMENTS

| | | | |
|---|---|---|---|
| 4,119,678 | A | 10/1978 | Neuzil et al. |
| 6,215,037 | B1 | 4/2001 | Padin et al. |
| 9,957,211 | B2 * | 5/2018 | Leal ................... C07C 7/005 |
| 2022/0017436 | A1 * | 1/2022 | Aldossary ............. C07C 7/13 |

OTHER PUBLICATIONS

Shailendra V. Bordawekar, et al., "Probing the Basic Character of Alkali-Modified Zeolites by $CO_2$ Adsorption Microcalorimetry, Butene Isomerization, and Toluene Alkylation with Ethylene", Journal of Catalysis, vol. 189, Issue 1, Jan. 1, 2000, pp. 79-90 (Abstract only).

* cited by examiner

PROCESS FOR SEPARATING 1-BUTENE FROM C4 RAFFINATE GAS COMPOSITION

BACKGROUND

Technical Field

The present disclosure is directed towards a process for separating 1-butene from a C4 raffinate gas composition that contains a mixture of 1-butene, iso-butene, and iso-butane using an adsorbent material, particularly, a process for separating 1-butene by using a zeolite adsorbent material.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The demand for C4 olefins is increasing, particularly for their application as co-polymers in linear low-density polyethylene and manufacturing of methyl tertiary butyl ether (MTBE) [Biaohua et al., AIChE 51, 3114-3121, 2005; Bender M., ChemBioEng. Rev. 1, 136-147, 2014]. Traditionally, C4 fractions are obtained from fluid catalytic crackers and steam cracking units in olefin plants. From the mixture of C4 fractions, butadiene is extracted, leaving a residual mixed C4 stream composed of n-butane, iso-butane, iso-butene, and n-butenes. Typically, the iso-butene component undergoes a conversion process to produce MTBE, utilizing methanol as a reactant. After the reaction, the reduced mixed C4 stream containing iso-butene is subjected to separation from MTBE and methanol through a combination of reactive and conventional distillation processes. The butenes (1-butene, cis-2-butene, and trans-2-butene) are recovered during the distillation process, while C4 paraffins are recycled, for example, back to the catalytic cracker. The separation of butenes can be achieved by chemical and/or physical procedures.

Chemical procedures for C4 olefins separation rely on selective reactions of the butenes, such as forming alcohols and ethers, oligomerization, and isomerization. On the other hand, the fractionation process operates on the principle of differences in boiling points, while the extraction process is based on differences in solubilities in suitable solvents. Before most separation processes, selective hydrogenation is performed to eliminate acetylene and allenes, unless this step has already been carried out prior to butadiene extraction.

Physical procedures rely on the different adsorption properties of molecular sieves with respect to each butene component. The molecular sieve separation process exploits the methyl branching of iso-butene, rendering it too bulky to be adsorbed in the uniform size 3-5 Å pore molecular sieves. As a result, n-butenes and butane are adsorbed, separating iso-butene from C4 raffinate with a purity of 99%. Molecular sieve extraction generally yields iso-butene purities of 99.1% at the most, whereas other processes give 99.9% purities [Joachim et al., C4-Hydrocarbons and Derivatives, Springer-Verlag, 1989].

The separation of propene from propane using ITQ-32 showed an improvement with respect to previous zeolites in achieving the separation of trans-2-butene and 1-butene from the C4 fraction using only one zeolite [Palomino et al., Chem. Commun., 1233-1235, 2007]. The separation of butenes based on molecular organic frameworks, ferrierite zeolites, HZSM-5, silicalite, and HY has been reported [Li et al. Chem. Soc. Rev., 38, 1477-1504, 2009; Migliardini et al. Am. J. Anal. Chem., 4, 109-114, 2013]. Supported Cu/13X molecular sieve adsorbents prepared by the impregnation method provide a maximum adsorption capacity under the conditions of $CuCl_2$ loading 5.67%, calcining temperature 350° C., calcining time 1.0 h, adsorption temperature 35-40° C., and atmospheric pressure [Qin et al., Shiyou Huagong/Petrochemical Technology, 44, 724-728, 2015].

Furthermore, Al-Dossary et al. [Al Dossary, M., Shaik, M. N., Al-Majnouni, K. A., Rahman, F., Palani, A., Asaoka, S., Al-Yami, M. A. Baduruthamal, U. US 2022/0017436 A1; and Al Dossary, M., Shaik, M. N., Al-Majnouni, K. A., Rahman, F., Palani, A., Asaoka, S., Al-Yami, M. A. Baduruthamal, WO 2020/128834 A1] describes a process for the separation of olefin components from a mixture of butanes and butenes utilizing distillation and adsorbents separation process. The method includes fractionating the C4 hydrocarbon mixture in a first separation section to form (1) a first olefin stream comprising primarily 1-butene and iso-butene collectively and (2) a first byproduct stream that contains primarily cis-2-butene and trans-2-butene collectively. As shown in FIG. 1, the adsorption process is then used to selectively separate 1-butene from the first olefin stream.

The selective separation of 1-butene from mixed C4-stream economically is thus very important for the petrochemical industry. The need to recover high purity (~100%) 1-butene from the C4-stream is one of high economic significance in providing clean feeds for subsequent processes, such as polymerization reactions.

U.S. Pat. No. 6,215,037B1 discloses ion-exchanged zeolite adsorbents and methods for separating dienes from mono-olefins using the adsorbents. U.S. Pat. No. 3,982,912A discloses a type of zeolite by replacing ion-exchangeable active cations in A-type zeolite with potassium ions and divalent cations. The A-type zeolite selectively adsorbs 1-butene and trans-2-butene but adsorbs very little cis-2-butene. CN102329179A discloses a method for absorbing and purifying butene using vapor state molecular sieve using multiple adsorbent beds. The method is for preparing high purity butene. U.S. Pat. No. 3,785,122A discloses a process of preparing A-type zeolite having specific molecular sieving actions and a method of using said zeolite to separate a mixture of substances into substances having a different adsorption effective cross-sectional area. The A-type zeolite was prepared by bringing A-type zeolite into contact with solutions containing potassium ions and zinc ions, simultaneously or successively, to allow the ion exchange of ion-exchangeable cations in said A-type zeolite. The prepared A-type zeolite is suitable for the separation and purification of germane, cis-2-butene, and trans-2-butene. U.S. Pat. No. 4,119,678A discloses a process for separation of butene-1 from other C4 mono-olefins. A feed stream containing butene-1 was contacted with a K-X zeolite which selectively adsorbs butene-1. The butene-1 was desorbed using a mixture of hexene-1 and cyclohexene or cyclohexane. US20220017436A1 discloses a process for the separation of olefin components from a mixture of butanes and butenes using a distillation and an adsorbents separation process. The method includes fractionating the C4 hydrocarbon mixture in a first separation section to form a first olefin stream comprising primarily 1-butene and iso-butene collectively and a first byproduct stream that comprises primarily cis-2-butene and trans-2-butene collectively. The adsorption process is then used to selectively separate 1-butene from the first olefin stream.

U.S. Pat. No. 9,957,211B2 discloses a process for separating and purifying C4 fractions from a crude C4 stream comprising selectively hydrogenating a crude C4 stream to remove acetylenic impurities contained therein, distilling the hydrogenated crude C4 stream to remove butadiene impurities contained in the hydrogenated crude C4 stream, forming a distillate stream and a bottoms stream, exposing the distillate to a separation unit comprising a solid adsorbent to produce a first product stream comprising 1-butene and a second product stream comprising iso-butene, reacting the second product stream with a methanol stream to produce methyl tertiary-butyl ether.

CN104030874B discloses a process for separating n-butene and iso-butene based on carbon molecular sieve adsorption comprising introducing n-butene and iso-butene mixed gas into an adsorption tower with the pore-adjusted carbon molecular sieve, and effectively adsorbing n-butene by using a three-tower or multi-tower variable pressure adsorption technique through a non-balance effect, wherein iso-butene of which the purity is 99-99.5% can be obtained at a discharge hole; achieving high-purity and high-yield separation of n-butene through a replacement step.

U.S. Pat. No. 9,067,852B2 discloses a hybrid process comprising an adsorption process and a distillation process for separation of butene-1 from a C4 hydrocarbon mixture gas including butene-1, trans-2-butene, cis-2-butene, normal butane, iso-butane. U.S. Pat. No. 7,148,392B2 discloses a process for selectively separating 1-butene from a C4 feed stream comprising at least 1-butene, cis-2-butene and trans-2-butene, the feed stream is passed through a first bed of an adsorbent comprising a crystalline microporous material to form a substantially trans-2-butene-free effluent stream. Then, the substantially trans-2-butene-free effluent stream is passed through a second bed of an adsorbent comprising a crystalline microporous material to form a substantially 1-butene-free effluent stream, whereby the 1-butene is separated from the feed stream. The adsorbed 1-butene is then typically desorbed from the second adsorbent bed either by lowering the pressure or raising the temperature of the bed. U.S. Pat. No. 5,955,640A discloses an integrated process for production of butene-1 comprising feeding a C4 hydrocarbon stream to a separation unit of butene-1 and recycling the remaining stream to the same unit after treatment in a bond isomerization section to convert the remaining butenes-2 into butene-1, a molecular sieve separation unit is inserted in the cycle operating with the hydrocarbons in a vapor phase, for the purge of the paraffins. U.S. Pat. No. 4,455,445A discloses a process for separation of normal C4 hydrocarbons from iso-butylene by contacting a mixture of the normal C4 hydrocarbons and iso-butylene with a molecular sieve comprising silicalite which is selective for the normal C4 hydrocarbons. The iso-butylene is then recovered in the raffinate stream, and the normal C4 hydrocarbons are recovered by displacement with pentene-1. U.S. Pat. No. 3,723,561A discloses a process for the separation of butene-1 from other C4 mono-olefins by contacting a feed stream containing butene-1 along with another C4 mono-olefin with a crystalline aluminosilicate adsorbent selected from X or Y zeolites containing barium or potassium cations at conditions to tune the selective adsorption of butene-1.

The recovery of high-purity (~100%) 1-butene from the C4 stream holds considerable economic significance, as it ensures the provision of clean feeds for subsequent processes, particularly polymerization reactions. Despite recent advances in this field, there is still a crucial need to develop an enhanced process for the efficient recovery of high-purity (~100%) 1-butene.

In view of the foregoing, it is one objective of the present disclosure to describe a process for separating 1-butene from a C4 raffinate gas composition. Furthermore, a second objective of the present disclosure is to describe a method of making an alkali-modified zeolite adsorbent for the separation of 1-butene.

SUMMARY

In an exemplary embodiment, a process for separating 1-butene from a C4 raffinate gas composition is described. The process includes introducing the C4 raffinate gas composition to a reactor containing an adsorbent material and passing the C4 raffinate gas composition through the adsorbent material; adsorbing the 1-butene from the C4 raffinate gas composition onto the adsorbent material to separate the 1-butene from the C4 raffinate gas composition and form a residue gas composition; and desorbing the 1-butene by heating the adsorbent material after the adsorbing to form the 1-butene and regenerate the adsorbent material. In some embodiments, at least about 95% by weight of hydrocarbons present in the C4 raffinate gas composition is a mixture of 1-butene, iso-butene, and iso-butane. In some embodiments, the adsorbent material is at least one of a zeolite adsorbent and an alkali-modified zeolite adsorbent. In some embodiments, the adsorbent material has a particle size in a range of about 0.5 to 1 millimeters (mm), and a pore size in a range of about 4 to 12 angstrom (Å). In some embodiments, the adsorbent material is at least about 99% by weight selective towards 1-butene for adsorption in comparison to iso-butene and iso-butane.

In some embodiments the C4 raffinate gas composition further contains an inert carrier gas.

In a specific embodiment the C4 raffinate gas composition includes about 3 to 10 wt. % 1-butene, about 1 to 5 wt. % iso-butene, about 0.05 to 0.5 wt. % iso-butane, and $N_2$ as a balance, each wt. % based on a total weight of the C4 raffinate gas composition.

In some embodiments the reactor is at least one selected from the group consisting of a fixed-bed reactor, a trickle-bed reactor, a moving bed reactor, a rotating bed reactor, a fluidized bed reactor, and a slurry reactor.

In a specific embodiment the reactor is the fixed-bed reactor in the form of a cylindrical reactor comprising a top portion, a cylindrical body portion, a bottom portion, a housing having an open top, and open bottom supportably maintained with the cylindrical body portion, at least one propeller agitator is disposed in the bottom portion of the reactor. In some embodiments, the adsorbent material is supportably retained within the housing permitting fluid flow therethrough.

In some embodiments, the housing retaining particles of the adsorbent material is in a packed bed configuration. The adsorbent material is tightly packed inside the housing, creating a uniform and dense column containing the adsorbent material particles. In a preferred embodiment, the fluid flows through the spaces between the adsorbent material particles, contacting the surface of the adsorbent material and undergoing the adsorption process.

In some embodiments, the housing retaining particles of the adsorbent material may further contain perforated plates and/or grids that are evenly stacked or spaced at intervals within the cylindrical body portion. In a preferred embodiment, the plates and/or grids have holes or openings that permit the fluid to pass through while keeping the adsorbent material particles contained.

In some embodiments, the housing retaining particles of the adsorbent material may further contain one or more fixed support structures selected from the group consisting of a rod, a baffle, and a shelve, that help retain the adsorbent material particles in the housing.

In some embodiments, the housing retaining particles of the adsorbent material may be in a monolithic structure having a plurality of intricate internal channels and a plurality of pores. In some other embodiments, the housing retaining particles of the adsorbent material may be in a honeycomb-like structure having a network of interconnected channels and cells.

In some embodiments, the fluid, e.g., the C4 raffinate gas composition, flows axially from the opening top to the opening bottom of the housing, passing through the adsorbent material in the process.

In some embodiments, the bottom portion is cone shaped or pyramidal. In some embodiments, a plurality of recirculation tubes fluidly connects the bottom portion of the cylindrical reactor with the cylindrical body portion of the cylindrical reactor. In some embodiments, the reactor has an aspect ratio of length (L) to inner diameter (ID) of about 20:1 to 50:1.

In some embodiments, during the introducing and adsorbing steps, the C4 raffinate gas composition is in contact with the adsorbent material at a flow rate of about 10 to 40 milliliters per minute (mL/min) per gram of the adsorbent material at a temperature of about 30 degree Celsius (C) and a pressure of about 1 bar.

In some embodiments, the adsorbing is performed at atmospheric pressure and a temperature in a range of about 10 to 100° C.

In some embodiments, the adsorbent material is the zeolite adsorbent. In some embodiments, the zeolite adsorbent has a specific surface area of about 450 to 550 square meters per gram ($m^2\ g^{-1}$). In some embodiments, the zeolite adsorbent has a micropore volume ($V_{mic}$) of about 0.001 to 0.07 cubic centimeters per gram ($cm^3\ g^{-1}$). In some embodiments, the zeolite adsorbent has a pore size of about 4 to 7 Å.

In some embodiments, the zeolite adsorbent includes about 43 to 44 wt. % O, about 4 to 7 wt. % Na, about 16 to 18 wt. % Al, about 17 to 18 wt. % Si, about 15 to 17 wt. % Ca, and about 0.01 to 1 wt. % Fe, each wt. % based on the total weight of the alkali-modified zeolite adsorbent as determined by X-ray fluorescence spectrometry (XRF).

In some embodiments, the zeolite adsorbent has an equilibrium uptake capacity towards 1-butene from about 12 to 20% based on a total weight of the zeolite adsorbent measured at a pressure of about 90 to 950 millibars (mbar) and a temperature of about 25° C.

In some embodiments, the adsorbent material is the alkali-modified zeolite adsorbent. In some embodiments, the alkali-modified zeolite adsorbent is at least one selected from the group consisting of a potassium-modified zeolite adsorbent, a sodium-modified zeolite adsorbent, and a calcium-modified zeolite adsorbent.

In some embodiments, the alkali-modified zeolite adsorbent has a specific surface area of about 330 to 490 $m^2\ g^{-1}$. In some embodiments, the alkali-modified zeolite adsorbent has a micropore volume ($V_{mic}$) of about 0.05 to 0.3 $cm^3\ g^{-1}$. In some embodiments, the alkali-modified zeolite adsorbent has a pore size of about 5 to 12 Å.

In some embodiments, the alkali-modified zeolite adsorbent has an equilibrium uptake capacity towards 1-butene from about 10 to 18% based on a total weight of the alkali-modified zeolite adsorbent measured at a pressure of about 90 to 950 mbar and a temperature of about 25° C.

In a specific embodiment, the desorption of 1-butene is performed by heating the adsorbent material after the adsorbing at a temperature of about 130 to 170° C.

In some embodiments, the adsorbent material is the alkali-modified zeolite adsorbent and the 1-butene formed after the desorbing does not contain any degradation product.

In some embodiments, the process for separating 1-butene from the C4 raffinate gas composition has a breakthrough time of about 60 to 200 minutes at a flow rate of about 22.5 mL/min of C4 raffinate gas composition per gram of the adsorbent material at a temperature of about 30° C. and a pressure of about 1 bar.

In some embodiments, the adsorbent material is the alkali-modified zeolite adsorbent, and the method further includes preparing the alkali-modified zeolite adsorbent by mixing particles of a zeolite adsorbent in an alkali solution and heating, thereby allowing the zeolite adsorbent particles to react with alkali ions in the alkali solution to form a suspension containing an alkali-modified zeolite adsorbent precursor, and removing the alkali-modified zeolite adsorbent precursor from the suspension by filtering, washing, drying, and calcining at a temperature of about 500 to 600° C. to form the alkali-modified zeolite adsorbent. In some embodiments, the alkali solution has a concentration of about 0.01 to 5 M.

In some embodiments, the alkali solution contains at least one alkali salt selected from the group consisting of potassium hydroxide (KOH), sodium hydroxide (NaOH), and calcium hydroxide ($Ca(OH)_2$).

In some embodiment, the alkali-modified zeolite adsorbent has an alkali content ranging from about 0.001 to 10 wt. % based on the total weight of the alkali-modified zeolite adsorbent. In some embodiment, the alkali-modified zeolite adsorbent has a temperature-programmed desorption of ammonia ($NH_3$-TPD) of about 0.05 to 0.1 mmol/g.

In some embodiments, the process for separating 1-butene from the C4 raffinate gas composition further comprises forming trans-2-butene and cis-2-butene, during the desorbing, in an amount of less than about 1 wt. % based on the total weight of hydrocarbons adsorbed on the adsorbent material.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
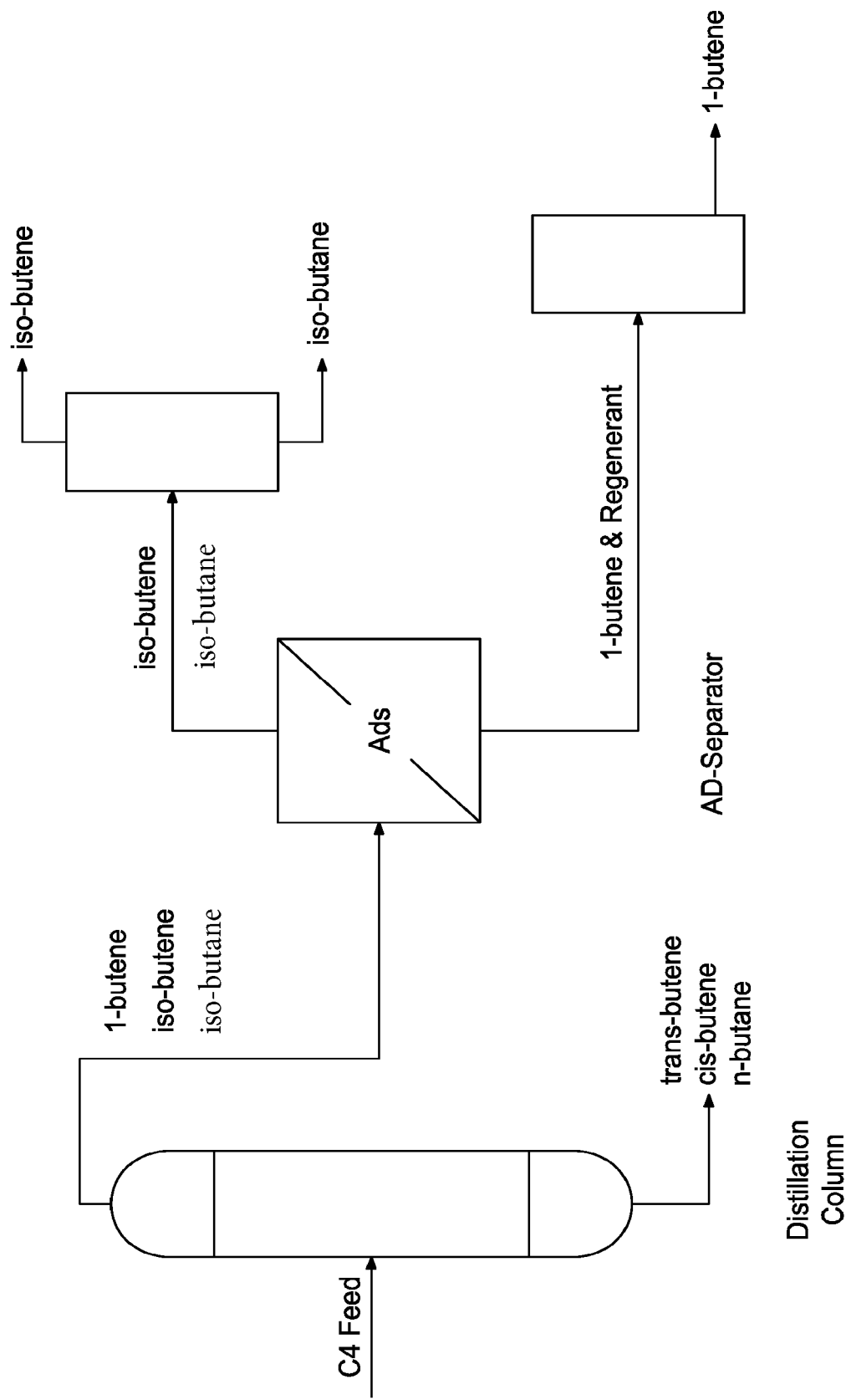
FIG. 1 is a schematic diagram of a process for separating 1-butene.

In the drawings, like reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the term "separating" refers to splitting a mixture of molecules into two or more distinct portions, each with a different composition. The term includes, but is not limited to, select, segregate, partition, isolate, collect, keep apart, disunite, and the like.

As used herein, the term "gas composition" refers to make-up of various gas components in the gas. Such make-up may be given in volume percentages or weight percentages.

As used herein, the term "reactor" refers to a vessel such as a separation unit. The separation unit includes, but not limited to, an adsorption unit comprising at least one adsorbent bed, a multi-stage adsorption unit comprising a plurality of adsorption stages or adsorption vessels, a multi-bed adsorption unit comprising a plurality of adsorption beds, or any combination thereof. The term includes, but is not limited to, a fixed-bed reactor, a trickle-bed reactor, a moving bed reactor, a rotating bed reactor, a fluidized bed reactor, and a slurry reactor.

As used herein, the term "contact" refers to placing a gas or gas composition and an adsorbent material in immediate proximity or association. The term includes, but is not limited to, touching, associating, joining, combining, and the like.

As used herein, the term "C4 hydrocarbons" or "C4" are used interchangeably and refers to hydrocarbons having four carbon atoms.

As used herein, the term "C4 raffinate" refers to a feed stream comprising a mixture of C4 hydrocarbons.

As used herein, the term "adsorption" includes physisorption, chemisorption, condensation onto a solid material and combinations thereof.

As used herein, the term "material" refers to the composition of matter in the broadest sense.

As used herein, the term "adsorbent material" refers to a material that adsorbs or absorbs target chemical substances.

As used herein, the term "desorbing" refers to a reverse process of absorbing and/or a reverse process of adsorbing.

As used herein, the term "regenerate" refers to recovering at least a portion of the initial activity of adsorbent material and/or making the adsorbent material reusable.

As used herein, the term "degradation product" refers to an impurity resulting from a chemical change in composition brought about during adsorption and/or desorption of the composition over an adsorbent material.

Aspects of the present disclosure are directed to an efficient process for the selective separation of high-purity 1-butene from a mixture of butenes and butanes such as a C4-stream from a steam cracking unit or Raffinate-I using an adsorbent material. The use of adsorbents, such as 3A, 4A, 5A, SAPO-34, and SAPO-41 with pores of small to medium size (3 to 5.6 Å), as adsorbent materials for the separation of 1-butene based on size exclusion is described herein. The use of adsorbents with pore sizes 5 Å using a 3-component feed gas mixture of 1-butene, iso-butene, and n-butane is described herein.

Figure 2A:
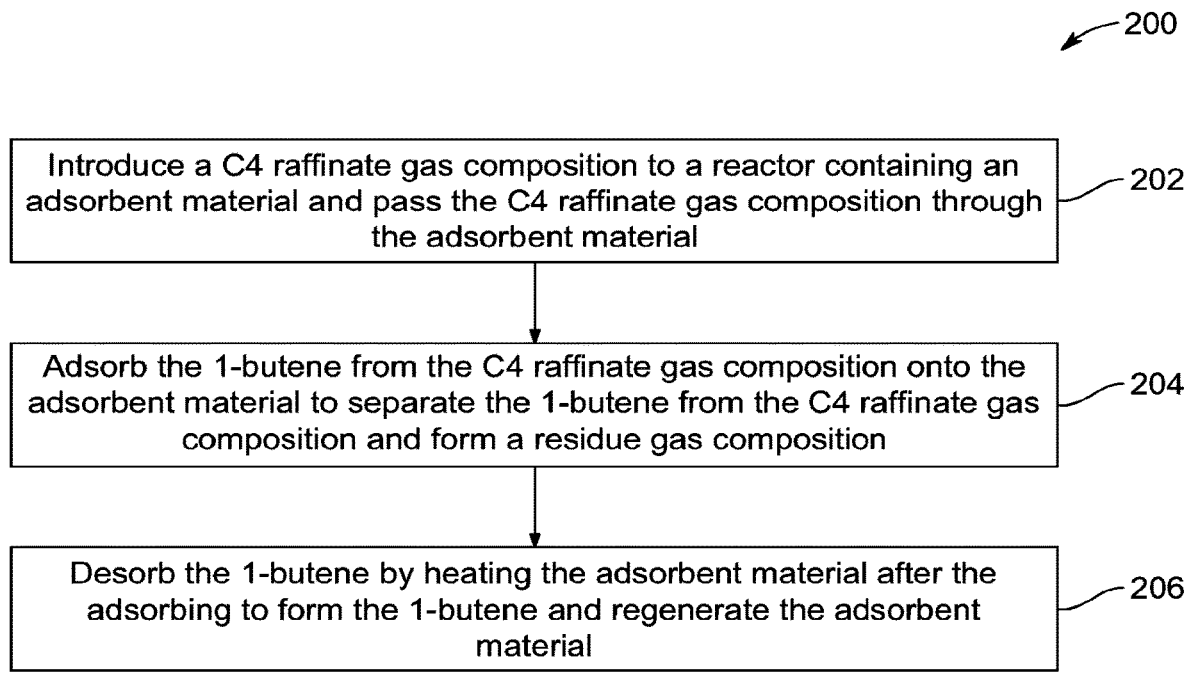
FIG. 2A is a flowchart depicting a method for separating 1-butene from a C4 raffinate gas composition, according to certain embodiments.

FIG. 2A illustrates a flow chart of a method 200 for separating 1-butene from a C4 raffinate gas composition. The order in which the method 200 is described is not intended to be construed as a limitation, and any number of the described method steps can be combined in any order to implement the method 200. Additionally, individual steps may be removed or skipped from the method 200 without departing from the spirit and scope of the present disclosure.

At step 202, the method 200 includes introducing the C4 raffinate gas composition to a reactor containing an adsorbent material and passing the C4 raffinate gas composition through the adsorbent material. In some embodiments, at least 95% by weight of hydrocarbons present in the C4 raffinate gas composition is a mixture of 1-butene, iso-butene, and iso-butane. In some embodiments, at least 96%, preferably at least 97%, preferably at least 98%, or even more preferably at least 99% by weight of hydrocarbons present in the C4 raffinate gas composition is a mixture of 1-butene, iso-butene, and iso-butane. In some embodiments, the C4 raffinate gas composition further includes an inert carrier gas. The inert carrier gas may be Helium (He), nitrogen ($N_2$), hydrogen ($H_2$), and argon (Ar). In some embodiments, the C4 raffinate gas composition includes 3 to 10 wt. % 1-butene; 1 to 5 wt. % iso-butene; 0.05 to 0.5 wt. % iso-butane; and $N_2$ as a balance, each wt. % based on the total weight of the C4 raffinate gas composition. In some embodiments, the C4 raffinate gas composition includes 4 to 9 wt. %, preferably 5-8 wt. %, preferably 6-7 wt. %, preferably 6.5 wt. % 1-butene; 1 to 5 wt. %, preferably 2-4 wt. %, preferably 2.5-3.5 wt. %, preferably 3.2 wt. % iso-butene; 0.05 to 0.5 wt. %, preferably 0.1-0.4 wt. %, preferably 0.2-0.3 wt. %, preferably 0.2 wt. % iso-butane;

and N₂ as a balance, each wt. % based on the total weight of the C4 raffinate gas composition. In an embodiment, the weight percentage of nitrogen in the C4 raffinate gas composition is in the range of 85-95 wt. %, preferably 87-93 wt. %, preferably 89-91 wt. %, preferably 90-90.5 wt. %, preferably 90.1 wt. % in the composition. Other ranges are also possible.

The C4 raffinate gas composition is introduced into the reactor, including the adsorbent material, and further contacted with the adsorbent material, e.g., passed through a bed of the adsorbent material. The adsorbent material may be a zeolite adsorbent and/or an alkali-modified zeolite adsorbent. In some embodiments, the adsorbent material is zeolite. In some embodiments, the adsorbent material has a particle size in a range of 0.5 to 1 millimeters (mm), preferably 0.6 to 0.9 mm, or even more preferably 0.7 to 0.8 mm. In some further embodiments, the adsorbent material has a pore size in a range of 2 to 20 angstrom (Å), preferably 3 to 18 Å, preferably 5 to 15 Å, preferably 6 to 12 Å, or even more preferably about 9 Å. Other ranges are also possible.

As used herein, the term "N₂ adsorption/desorption method" generally refers to a technique used to measure the specific surface area of a solid material, such as an adsorbent material or a porous material. In some embodiments, the adsorbent material is exposed to a stream of nitrogen gas at low temperature and pressure. The nitrogen gas is adsorbed onto the surface of the adsorbent material, filling the pores and creating a monolayer of adsorbed nitrogen. In some further embodiments, the amount of nitrogen adsorbed at a given pressure is measured using a gas adsorption instrument, such as a Autosorb-1 (Quanta Chrome) instrument. In some preferred embodiments, the BET analysis is performed on a Autosorb-1 analyzer according to the software manual. In some more preferred embodiments, the nitrogen gas is gradually removed from the adsorbent material, causing the desorption of the adsorbed nitrogen. The amount of nitrogen desorbed at a given pressure is also measured using the gas adsorption instrument. By analyzing the amount of nitrogen adsorbed and desorbed, the specific surface area of the adsorbent material can be calculated using the BET (Brunauer-Emmett-Teller) and Barrett, Joyner and Halenda (BJH) equation.

In an embodiment, the adsorbent material is the zeolite adsorbent having a specific surface area of about 450 to 550, preferably 460-540, preferably 460-530, preferably 460-520 square meters per gram ($m^2\ g^{-1}$). In an embodiment, the adsorbent material is the zeolite adsorbent having a micropore volume ($V_{mic}$) of about 0.001 to 0.07, preferably 0.002 to 0.006, preferably 0.003 to 0.055, preferably 0.004 to 0.052 cubic centimeters per gram ($cm^3\ g^{-1}$). In an embodiment, the adsorbent material is the zeolite adsorbent having a pore size of about 4 to 7, preferably 4.2 to 6.8 Å.

Figure 5:
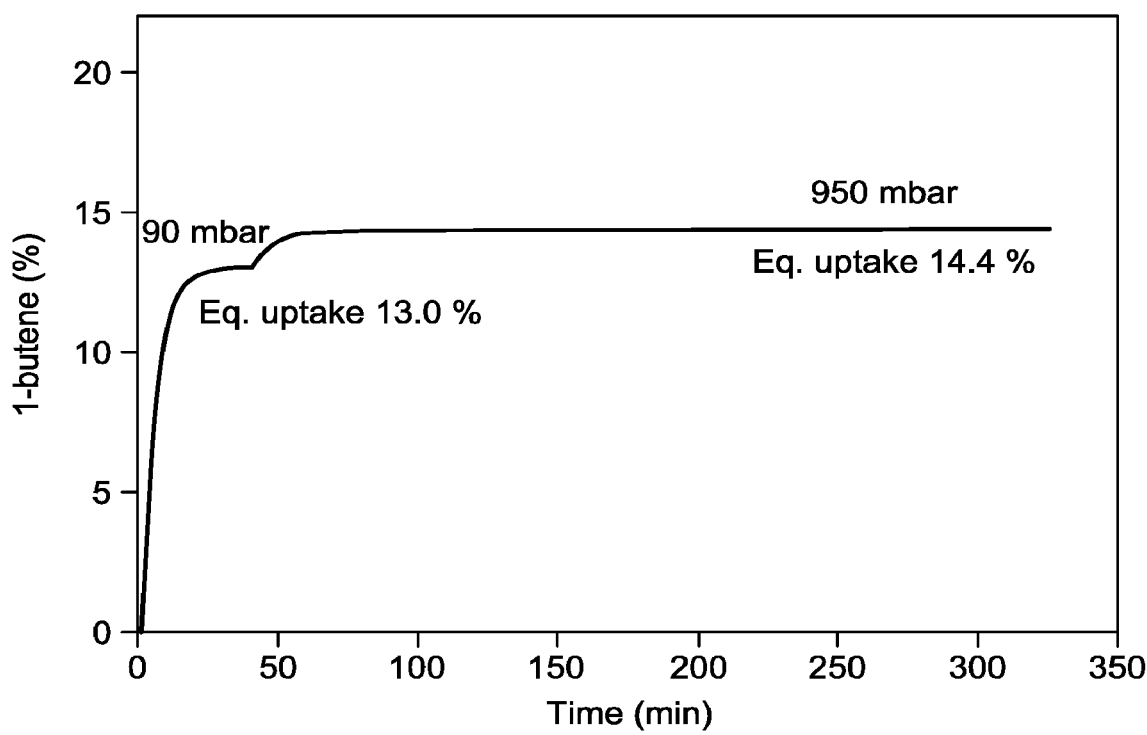
FIG. 5 shows a plot displaying sorption-time curve for adsorption of 1-butene over 5A-ECZ1 at 25° C. and at pressures 90 and 950 millibar (mbar), according to certain embodiments.
Figure 6:
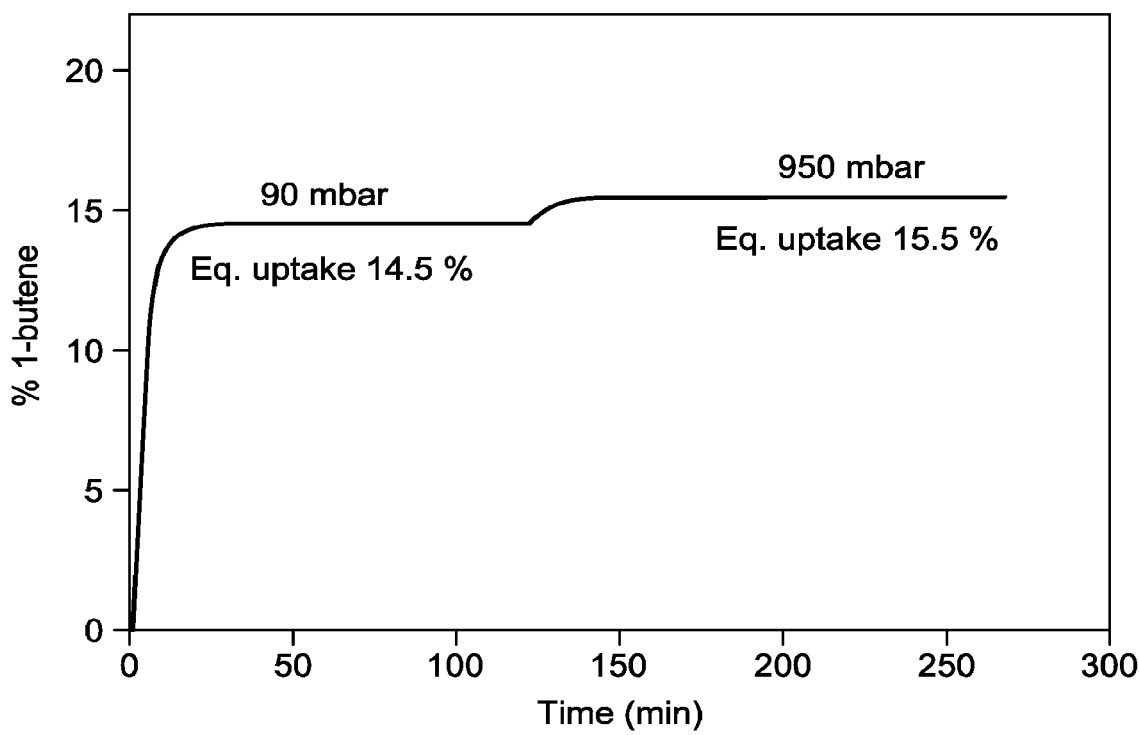
FIG. 6 shows a plot displaying sorption-time curve for adsorption of 1-butene over 5A-ECZ75 at 25° C. and at pressures 90 and 950 mbar, according to certain embodiments.

In some embodiments, referring to FIGS. 5 and 6, the zeolite adsorbent has an equilibrium uptake capacity towards 1-butene from 12 to 20%, preferably 13-18%, preferably 13-15% based on the total weight of the zeolite adsorbent measured at a pressure of 90 to 950 millibars (mbar) and a temperature of about 25° C. Other ranges are also possible.

In some embodiments, the zeolite adsorbent includes about 43 to 44 wt. % O, about 4 to 7 wt. % Na, about 16 to 18 wt. % Al, about 17 to 18 wt. % Si, about 15 to 17 wt. % Ca, and about 0.01 to 1 wt. % Fe, each wt. % based on the total weight of the zeolite adsorbent as determined by X-ray fluorescence spectrometry (XRF). In some further embodiments, the zeolite adsorbent includes about 43.69 wt. % O, about 4.30 wt. % Na, about 17.21 wt. % Al, about 17.65 wt. % Si, about 16.55 wt. % Ca, and about 0.60 wt. % Fe, each wt. % based on the total weight of the zeolite adsorbent as determined by X-ray fluorescence spectrometry (XRF). In some preferred embodiments, the zeolite adsorbent includes about 43.71 wt. % O, about 6.19 wt. % Na, about 17.19 wt. % Al, about 17.75 wt. % Si, about 15.13 wt. % Ca, and about 0.03 wt. % Fe, each wt. % based on the total weight of the zeolite adsorbent as determined by X-ray fluorescence spectrometry (XRF). In some embodiments, the Si/Al ratio for the zeolite adsorbent is in a range of 0.5-3, preferably 1-2, preferably 1-1.5, preferably 1-1.2. Other ranges are also possible.

In some embodiments, the adsorbent material is an alkali-modified zeolite adsorbent. The alkali-modified zeolite adsorbent is at least one selected from the group consisting of a potassium-modified zeolite adsorbent, a sodium-modified zeolite adsorbent, and a calcium-modified zeolite adsorbent. In a preferred embodiment, the alkali-modified zeolite adsorbent is a sodium-modified zeolite adsorbent. In some embodiments, the alkali-modified zeolite has a specific surface area of 330 to 490, preferably 34- to 480, preferably 250 to 470 $m^2\ g^{-1}$. In some embodiments, the alkali-modified zeolite has a micropore volume ($V_{mic}$) of 0.05 to 0.3, preferably 0.07 to 0.0 0.25, preferably 0.09 to 0.2 $cm^3\ g^{-1}$. In some embodiments, the alkali-modified zeolite has a pore size of 5 to 12, preferably 5.5 to 11.75, preferably 5.75 to 11.5 Å. Other ranges are also possible.

Figure 7:
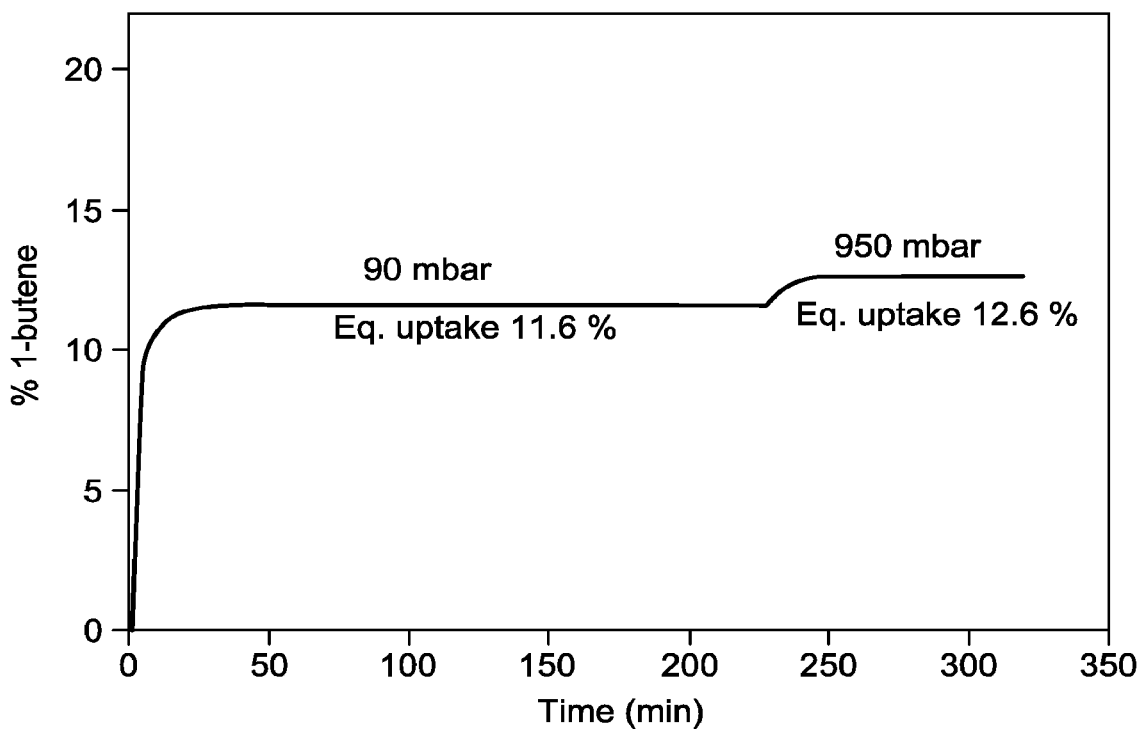
FIG. 7 shows a plot displaying sorption-time curve for adsorption of 1-butene over 5A-ECZ1-AT at 25° C. and at pressures 90 and 950 mbar, according to certain embodiments.
Figure 8:
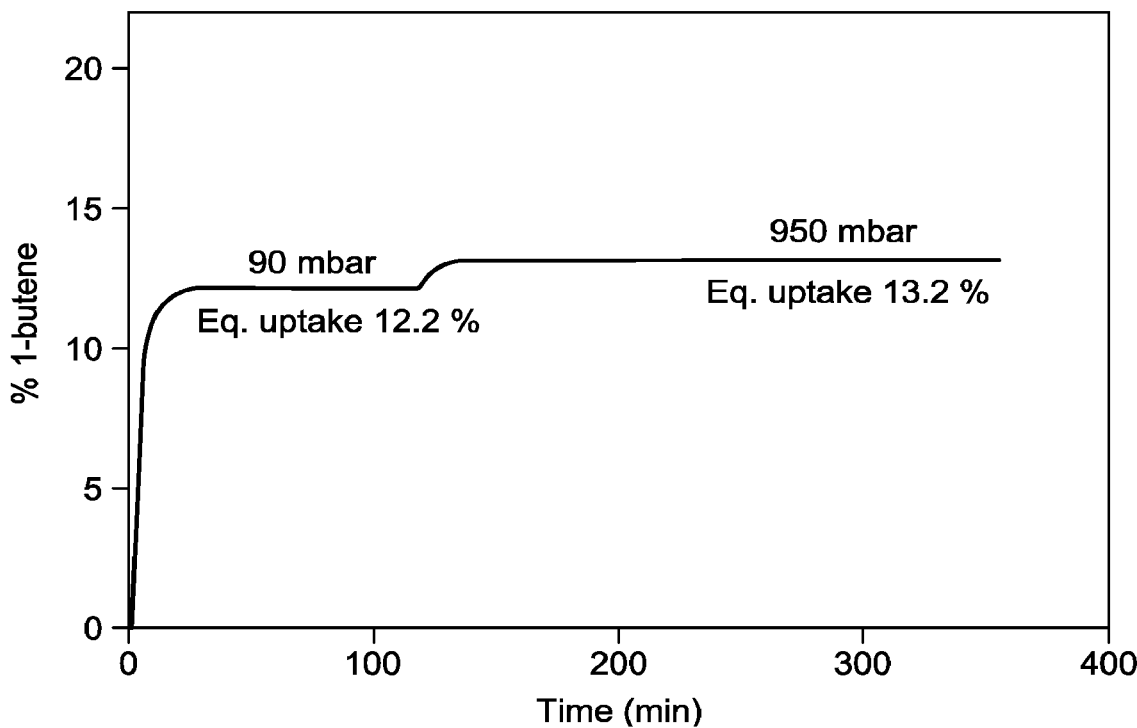
FIG. 8 shows a plot displaying sorption-time curve for adsorption of 1-butene over 5A-ECZ75-AT at 25° C. and at pressures 90 and 950 mbar, according to certain embodiments.

In some embodiments, referring to FIGS. 7 and 8, the alkali-modified zeolite adsorbent has an equilibrium uptake capacity towards 1-butene from 10 to 18%, preferably 11 to 17%, preferably 11 to 15%, preferably 12 to 14% based on the total weight of the alkali-modified zeolite adsorbent measured at a pressure of 90 to 950 mbar and a temperature of about 25° C. Other ranges are also possible.

The reactor may be one of a fixed-bed reactor, a trickle-bed reactor, a moving bed reactor, a rotating bed reactor, a fluidized bed reactor, and a slurry reactor. In a preferred embodiment, the reactor is a fixed-bed reactor. The fixed bed reactor is in the form of a cylindrical reactor, including a top portion; a cylindrical body portion; a bottom portion; and a housing having an open top and open bottom supportably maintained with the cylindrical body portion. The adsorbent material is supportably retained within the housing, permitting fluid flow therethrough. The reactor further includes at least one propeller agitator disposed in the bottom portion of the reactor. The bottom portion is cone-shaped or pyramidal. A plurality of recirculation tubes fluidly connects the bottom portion of the cylindrical reactor with the cylindrical body portion of the cylindrical reactor. In some embodiments, the reactor has an aspect ratio of length (L) to inner diameter (ID) of 20:1 to 50:1, preferably 25:1 to 45:1, preferably 20:1 to 40:1, preferably 25:1 to 35:1, or even more preferably about 30:1. Other ranges are also possible.

At step 204, the method 200 includes adsorbing the 1-butene from the C4 raffinate gas composition onto the adsorbent material to separate the 1-butene from the C4 raffinate gas composition and form a residue gas composition. In some embodiments, the adsorption is performed at an atmospheric pressure and a temperature in a range of 10 to 100° C., preferably 20-90° C., preferably 25-60° C. During this step, the C4 raffinate gas composition is in contact with the adsorbent material at a flow rate of 10 to 100 milliliters per minute (mL/min) per gram of the adsorbent material, preferably at a flow rate of 20 to 80 mL/min per gram of the adsorbent material, preferably at a flow rate of 40 to 60 mL/min per gram of the adsorbent material, or even more preferably at a flow rate of 40 to 50 mL/min per gram of the adsorbent material, at a temperature of about 20 to 40 degree Celsius (C), or more preferably about 30° C., and a pressure of 0.8 to 1.2 bar, or more preferably about 1 bar. Other ranges are also possible. The adsorbent material is at least 99% by weight, preferably at least 99.2% by weight, preferably at least 99.4% by weight, preferably at least 99.6% by weight, or even more preferably at least 99.8% by weight, selective towards 1-butene for adsorption in comparison to iso-butene and iso-butane. Other ranges are also possible.

In some embodiments, the zeolite adsorbent is selective towards 1-butene for adsorption in comparison to iso-butene and iso-butane by greater than 99%. In some embodiments, the alkali-modified zeolite adsorbent in selective towards 1-butene for adsorption in comparison to iso-butene and iso-butane by greater than 99%, preferably 99.2%, preferably 99.4%, preferably 99.5%, preferably 99.6%, preferably 99.7%, preferably 99.8%, preferably 99.9%, preferably 100%. Other ranges are also possible.

At step 206, the method 200 includes desorbing the 1-butene by heating the adsorbent material after the adsorbing to form the 1-butene and regenerate the adsorbent material. The desorption of 1-butene is performed by heating the adsorbent material after adsorption at a temperature of 120 to 200° C., preferably 130 to 180° C., preferably 140 to 160° C., or even more preferably about 150° C. Other ranges are also possible.

Figure 4A:
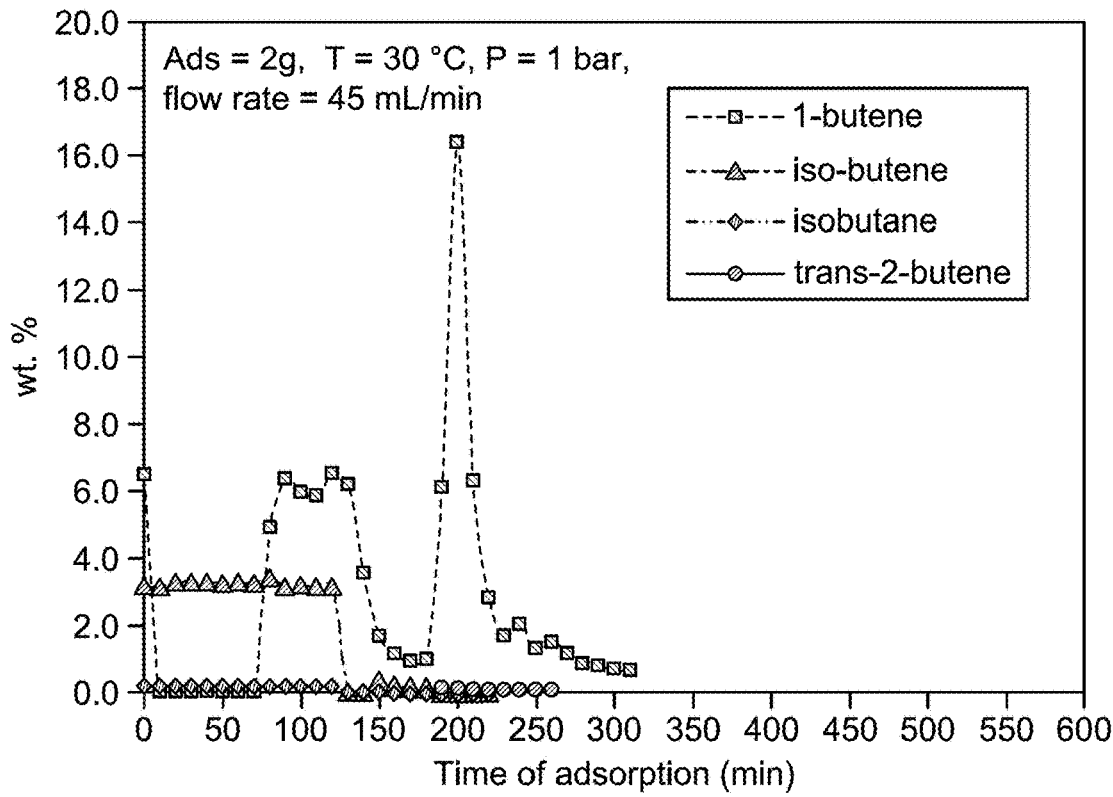
FIG. 4A shows a plot displaying adsorption behavior of C4 raffinate gas components over adsorbent, 5A-ECZ1, at 30° C. and at 1.0 bar, according to certain embodiments.
Figure 4B:
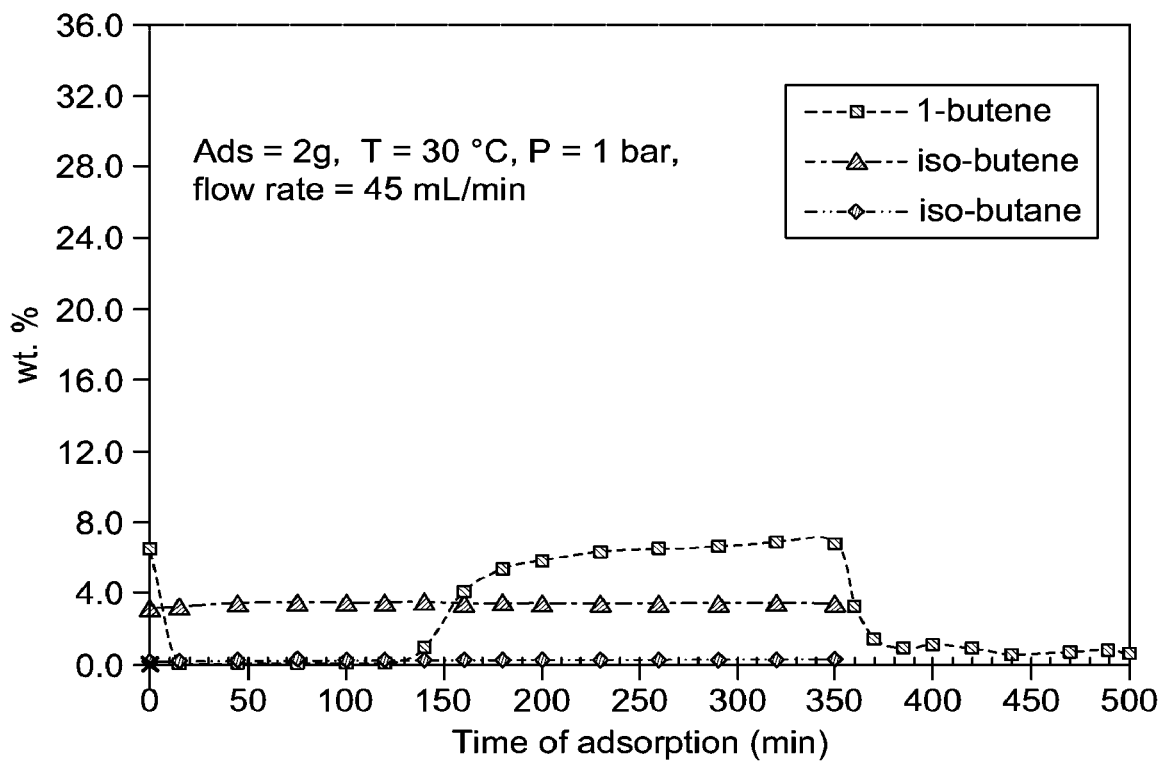
FIG. 4B shows a plot displaying adsorption behavior of C4 raffinate gas components over adsorbent, 5A-ECZ1-AT, at 30° C. and at 1.0 bar, according to certain embodiments.
Figure 4C:
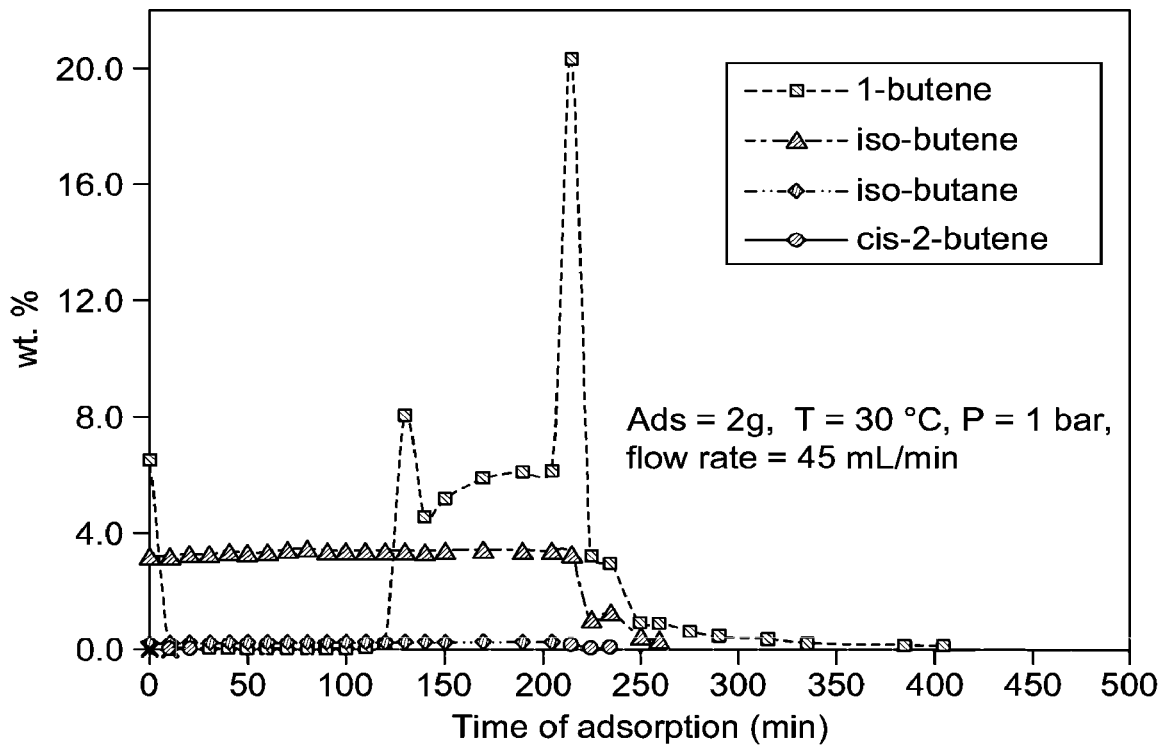
FIG. 4C shows a plot displaying adsorption behavior of C4 raffinate gas components over adsorbent, 5A-ECZ75, at 30° C. and at 1.0 bar, according to certain embodiments.

Referring to FIGS. 4A and 4C, when the adsorbent material is the zeolite adsorbent, the process for separating 1-butene has a breakthrough time of 50 to 140 minutes, preferably 60 to 130 minutes, preferably 70 to 120 minutes, preferably 80 to 110 minutes, or even more preferably 90 to 100 minutes, at a flow rate of about 20 to 30 mL/min, preferably about 22.5 mL/min of C4 raffinate gas composition per gram of the zeolite adsorbent at a temperature of about 30° C. and a pressure of about 1 bar.

Figure 4D:
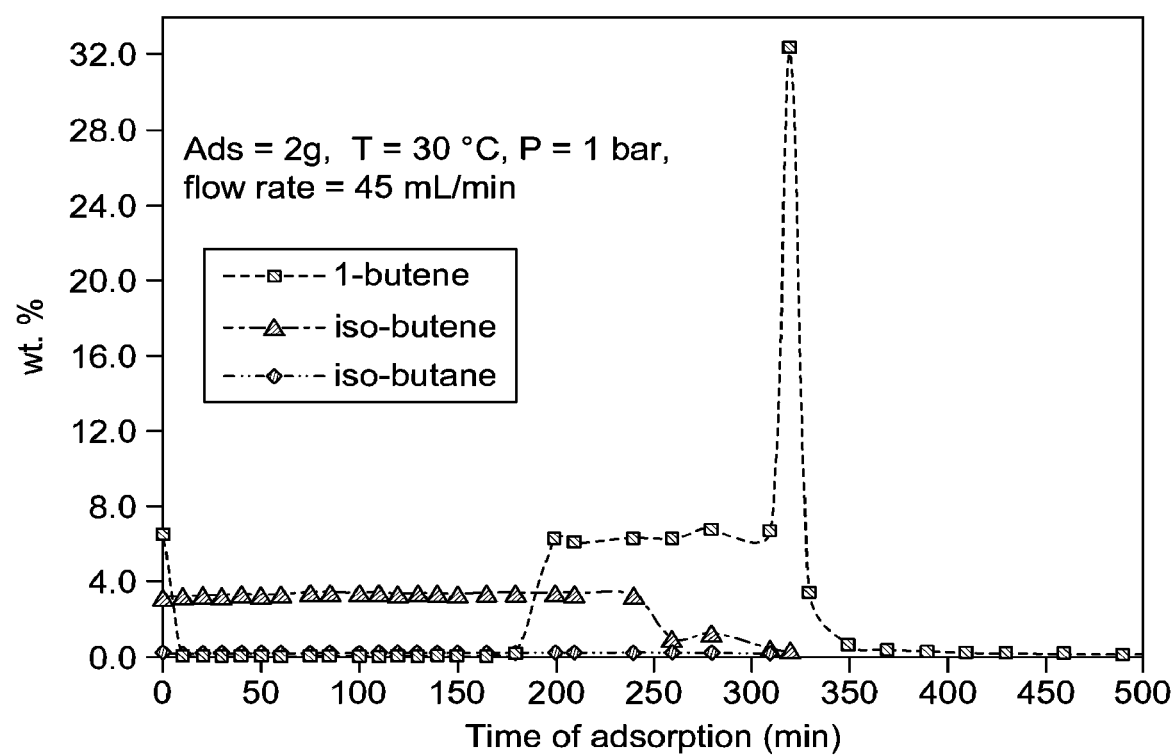
FIG. 4D shows a plot displaying adsorption behavior of C4 raffinate gas components over adsorbent, 5A-ECZ75-AT, at 30° C. and at 1.0 bar, according to certain embodiments.

Referring to FIGS. 4B and 4D, when the adsorbent material is the alkali-modified zeolite adsorbent, the process for separating 1-butene has a breakthrough time of 100 to 220 minutes, preferably 110 to 210 minutes, preferably 120 to 200 minutes, preferably 130 to 190 minutes, or even more preferably 140 to 180 minutes, at a flow rate of about 20 to 30 mL/min, preferably about 22.5 mL/min of C4 raffinate gas composition per gram of the alkali-modified zeolite adsorbent at a temperature of about 30° C. and a pressure of about 1 bar.

In some embodiments, when the adsorbent material is the zeolite adsorbent, the desorption process results in the formation of trans-2-butene and cis-2-butene, in an amount of less than 1 wt. %, preferably 0.9 wt. %, preferably 0.8 wt. %, preferably 0.7 wt. %, preferably 0.6 wt. %, preferably 0.5 wt. %, preferably 0.4 wt. %, preferably 0.3 wt. %, preferably 0.2 wt. %, preferably 0.1 wt. % based on the total weight of hydrocarbons adsorbed on the adsorbent material, as depicted in FIGS. 4A and 4C. Other ranges are also possible. When the adsorbent material is the alkali-modified zeolite adsorbent, the 1-butene formed after the desorption does not contain any degradation product, as depicted in FIGS. 4B and 4D.

Figure 2B:
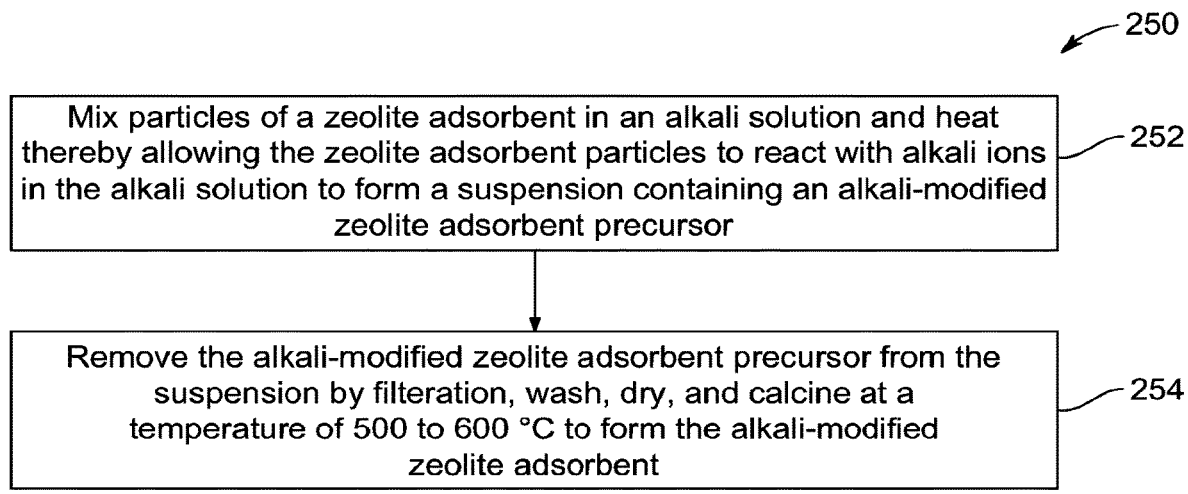
FIG. 2B is a flowchart depicting a method of preparing an alkali-modified zeolite adsorbent, according to certain embodiments.

FIG. 2B illustrates a flow chart of method 250 of making the alkali-modified zeolite adsorbent is described. The order in which the method 250 is described is not intended to be construed as a limitation, and any number of the described method steps can be combined in any order to implement the method 250. Additionally, individual steps may be removed or skipped from the method 250 without departing from the spirit and scope of the present disclosure.

At step 252, the method 250 includes mixing particles of a zeolite adsorbent in an alkali solution and heating, thereby allowing the zeolite adsorbent particles to react with alkali ions in the alkali solution to form a suspension containing an alkali-modified zeolite adsorbent precursor. The concentration of the alkali solution is in a range of 0.01 to 5 M, preferably 0.05 to 4.5M, preferably 1-4 M, preferably 2-3 M, preferably 2 M. Other ranges are also possible. The alkali solution includes at least one alkali salt is one or more of potassium hydroxide (KOH), sodium hydroxide (NaOH), and calcium hydroxide (Ca(OH) 2). In a preferred embodiment, the alkali salt is NaOH. In some embodiments, the particles of the zeolite adsorbent are mixed in the alkali solution using a mixer, or a centrifuge at 200-1000 revolutions per minute (rpm), preferably 300-800 rpm, preferably 400-500 rpm, preferably 500 rpm, and further heated to a temperature range of 60-100° C., preferably 65-95° C., preferably 70-90° C., preferably 75-85° C., preferably 80-85° C. for a period of 1-5 hours, preferably 1.5-4 hours, preferably 2-3 hours, preferably 2 hours, to obtain the alkali-modified zeolite adsorbent precursor.

At step 254, the method 250 includes removing the alkali-modified zeolite adsorbent precursor from the suspension by filtering, washing, drying, and calcining at a temperature of 500 to 600° C. to form the alkali-modified zeolite adsorbent. The alkali-modified zeolite adsorbent precursor is removed from the suspension via filtration, or any removing approaches known to those skilled in the art. The filtered alkali-modified zeolite adsorbent precursor is washed one or more times with a solvent, preferably water, till the unreacted inorganic salts are removed from the alkali-modified zeolite adsorbent precursor. The washed precursor is further dried at a temperature range of 100-150° C., preferably 100-120° C., for 12-24 hours to remove moisture. The dried alkali-modified zeolite adsorbent precursor is further calcined by placing the alkali-modified zeolite adsorbent precursor into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min, preferably up to 5° C./min. In preferred embodiments, the particles of the alkali-modified zeolite adsorbent precursor are heated to a temperature range of 500-600° C., preferably 520-590° C., preferably 530-580° C., preferably 540-560° C., preferably 550° C. for 2 to 8 hours, preferably 3 to 7 hours, preferably 4-6 hours, preferably 5 hours to form the alkali-modified zeolite adsorbent. Other ranges are also possible. In some embodiments, the alkali-modified zeolite adsorbent has an alkali content of from 19 to 40 wt. % based on the total weight of the alkali-modified zeolite adsorbent, preferably 20 to 35 wt. %, preferably 22 to 30 wt. %, or even more preferably 24 to 25 wt. % based on the total weight of the alkali-modified zeolite adsorbent.

As used herein, the term "temperature program desorption using ammonia," or "$NH_3$-TPD" generally refers to a technique used to study the surface acidity of a solid material, such as an adsorbent material. In some embodiments, the adsorbent material is first heated in an inert gas, such as nitrogen, to remove any adsorbed species and to stabilize the surface. In some embodiments, the adsorbent material is then cooled down and exposed to a stream of ammonia gas, which is adsorbed onto the surface of the adsorbent material. The amount of ammonia adsorbed is proportional to the surface acidity of the adsorbent material. In some embodiments, the adsorbent material is then heated at a constant rate while the amount of ammonia desorbed is monitored as a function of temperature. In some further embodiments, the temperature increases, the adsorbed ammonia begins to desorb from the surface of the adsorbent material. In some preferred embodiments, the desorption of ammonia may be exothermic, and the heat generated by the desorption process is monitored using a thermal conductivity detector.

The adsorbent material, including the zeolite adsorbent and the alkali-modified zeolite adsorbent, was characterized mainly using $NH_3$-TPD. Temperature programmed desorption (TPD) is a technique used to monitor surface interactions between molecular species on a surface when the surface temperature has changed in a controlled setting. This technique determines the strength of interactions between the adsorbent material and the alkali metal adsorbed on the adsorbent material. This is done by placing the adsorbent material inside a reactor and pushing an inert gas into the chamber. Alternatively, the sample can be located in an ultra-high vacuum (UHV) chamber with no carrier gas. The sample is dosed with a probe gas such as CO, $NH_3$, $H_2$, etc. The sample is then increased in temperature at a linear ramp rate, and the desorption products are analyzed by a mass spectrometer.

The $NH_3$-TPD may be conducted on a MicrotracBEL equipment. The adsorbent material was heated at a temperature of 100 to 600° C., preferably about 100 to 500° C. under a helium gas flow for 30 to 90 min, preferably about 60 min at a flow rate of 30 to 70 milliliters per minute (mL/min), preferably 50 mL/min. Other ranges are also possible. In some further embodiments, the adsorbent material was then cooled to less than 300° C., preferably less than 250° C. before contacting with a $NH_3$-containing gas mixture. In some preferred embodiments, $NH_3$ is present in the gas mixture at a concentration of 1 to 20%, preferably about 5 to 15%, or even more preferably about 10% by volume. In some more preferred embodiments, the MicrotracBEL equipment containing the adsorbent material is heated to a temperature of 600 to 700° C., preferably about 650° C. at a heating rate of 5 to 30° C./min, preferably 5 to 20° C./min, or even more preferably about 10° C./min. Other ranges are also possible.

In some further embodiments, the zeolite adsorbent has a temperature-programmed desorption of ammonia ($NH_3$-TPD) of 0.05 to 0.2 mmol/g, preferably 0.06 to 0.15 mmol/g, preferably 0.07 to 0.1 mmol/g, or even more preferably 0.08 to 0.09 mmol/g. Other ranges are also possible.

In some further embodiments, the alkali-modified zeolite adsorbent has a temperature-programmed desorption of ammonia ($NH_3$-TPD) of 0.05 to 0.2 mmol/g, preferably 0.06 to 0.15 mmol/g, preferably 0.07 to 0.1 mmol/g, or even more preferably 0.08 to 0.09 mmol/g. Other ranges are also possible.

In some embodiments, the present disclosure utilized 5 Å zeolite-based adsorbents, for example, preferably 5A-ECZ1, and preferably 5A-ECZ75, which showed 99% selectivity towards 1-butene (4.5 Å) and rejected the other two larger species, i.e., iso-butene (5.5 Å) and iso-butane (5.6 Å). However, the formation of less than 1 wt. % of trans-, and cis-2-butene was detected during the desorption step, in which each wt. % based on a total weight of hydrocarbons adsorbed on the adsorbent material.

In some further embodiments, the breakthrough time for adsorbents, for example, preferably 5A-ECZ1, and preferably 5A-ECZ75, was about 70 and 120 minutes, respectively. In some preferred embodiments, the equilibrium uptake capacity of 1-butene using 5A-ECZ1 and 5A-ECZ75 determined by an intelligent gravimetric analyzer (IGA) at atmospheric pressure and 25° C. was about 14.4% and about 15.5%, respectively.

In some embodiments, the alkali-modified zeolite adsorbent materials, for example, preferably 5A-ECZ1-AT, and preferably 5A-ECZ75-AT showed breakthrough times of about 120 and about 180 minutes, respectively, with 100% selectivity towards 1-butene without any other products detected during the desorption step at 150° C. In some further embodiments, the equilibrium uptake capacity of 1-butene using the alkali-modified zeolite adsorbents, e.g., preferably 5A-ECZ1-AT, and preferably 5A-ECZ75-AT, decreased to about 15.5%, and to about 13.2%, respectively.

EXAMPLES

The following examples demonstrate a method for a process for separating 1-butene from C4 raffinate gas composition using various adsorbents, as described herein. The examples are provided solely for illustration and are not to be construed as limitations of the present disclosure, as many variations thereof are possible without departing from the spirit and scope of the present disclosure.

Example 1: Preparation of Alkali-Modified Adsorbent Material 5A-ECZ1-AT

Alkaline treatment was carried out in 0.2 M aqueous NaOH solution (10 g of the adsorbent material per 100 mL of solution) for the preparation of 5A-ECZ1-AT. In an experiment, the alkaline solution was stirred at 500 revolutions per minute (rpm) and heated to 80° C., after which the adsorbent material was introduced. The resulting suspension was left to react for 2 h, followed by quenching, filtration, extensive washing using distilled water, overnight drying at 100° C., and calcination at 550° C. for 5 h to obtain alkali-modified adsorbent material 5A-ECZ1-AT.

Example 2: Preparation of Alkali-Modified Adsorbent Material 5A-ECZ75-AT

Alkaline treatment was carried out in 0.2 M aqueous NaOH solution (10 g of the adsorbent material per 100 mL of solution) for the preparation of 5A-ECZ75-AT. In an experiment, the alkaline solution was stirred at 500 rpm and heated to 80° C., after which the adsorbent material was introduced. The resulting suspension was left to react for 2 h, followed by quenching, filtration, extensive washing using distilled water, overnight drying at 100° C., and calcination at 550° C. for 5 h to obtain alkali-modified adsorbent material 5A-ECZ75-AT.

Example 3: X-Ray Fluorescence Spectrometry (XRF) Analysis of Adsorbent Materials The detailed composition of adsorbent materials 5A-ECZ1 and 5A-ECZ75 was analyzed by XRF spectrometry (Tables 1 & 2). The Si/Al ratio for 5A-ECZ1 and 5A-ECZ75 adsorbents was found to be 1.03.

TABLE 1

The XRF results for adsorbent material 5A-ECZ1.

| Element | Atomic Number | Series | Norm. C (wt. %) | Atom. C (at. %) |
|---|---|---|---|---|
| O | 8 | K-series | 43.69 | 59.27 |
| Na | 11 | K-series | 4.30 | 4.06 |
| Al | 13 | K-series | 17.21 | 13.84 |
| Si | 14 | K-series | 17.65 | 13.64 |
| Ca | 20 | K-series | 16.55 | 8.96 |
| Fe | 26 | K-series | 0.60 | 0.23 |
| | | Total | 100.00 | 100.00 |
| | | Si/Al | 1.03 | 0.99 |

TABLE 2

The XRF results for adsorbent material 5A-ECZ75.

| Element | Atomic Number | Series | Norm. C (wt. %) | Atom. C (at. %) |
|---|---|---|---|---|
| O | 8 | K-series | 43.71 | 58.77 |
| Na | 11 | K-series | 6.19 | 5.79 |
| Al | 13 | K-series | 17.19 | 13.71 |
| Si | 14 | K-series | 17.75 | 13.59 |
| Ca | 20 | K-series | 15.13 | 8.12 |
| Fe | 23 | K-series | 0.03 | 0.01 |
| | | Total | 100.00 | 100.00 |
| | | Si/Al | 1.03 | 0.99 |

Example 4: Analysis of Surface Properties of Adsorbent Materials

The surface properties of adsorbent materials (5A-ECZ1, 5A-ECZ75, 5A-ECZ1-AT & 5A-ECZ75-AT) were determined by nitrogen adsorption at −195° C. using Autosorb-1 (Quanta Chrome) using the Brunauer-Emmett-Teller (BET) equation. The physio-chemical properties i.e., BET surface area ($S_{BET}$), micropore volume ($V_{mic}$), and pore size, were determined and are summarized in Table 3. The $S_{BET}$, $V_{mic}$, and pore sizes of 5A-ECZ1 and 5A-ECZ75 decrease after the alkali modification. The results showed that the alkali treatment of the adsorbent materials results in a change in their textural properties.

TABLE 3

Physio-chemical properties of adsorbent materials.

| Adsorbent Material | $S_{BET}$ (m² g⁻¹) | $V_{mic}$ (cm³ g⁻¹) | Pore Size (Å) |
|---|---|---|---|
| 5A-ECZ1 | 463 | 0.052 | 4.26 |
| 5A-ECZ1-AT | 350 | 0.092 | 11.50 |
| 5A-ECZ75 | 520 | 0.004 | 6.68 |
| 5A-ECZ75-AT | 469 | 0.231 | 5.75 |

Figure 3:
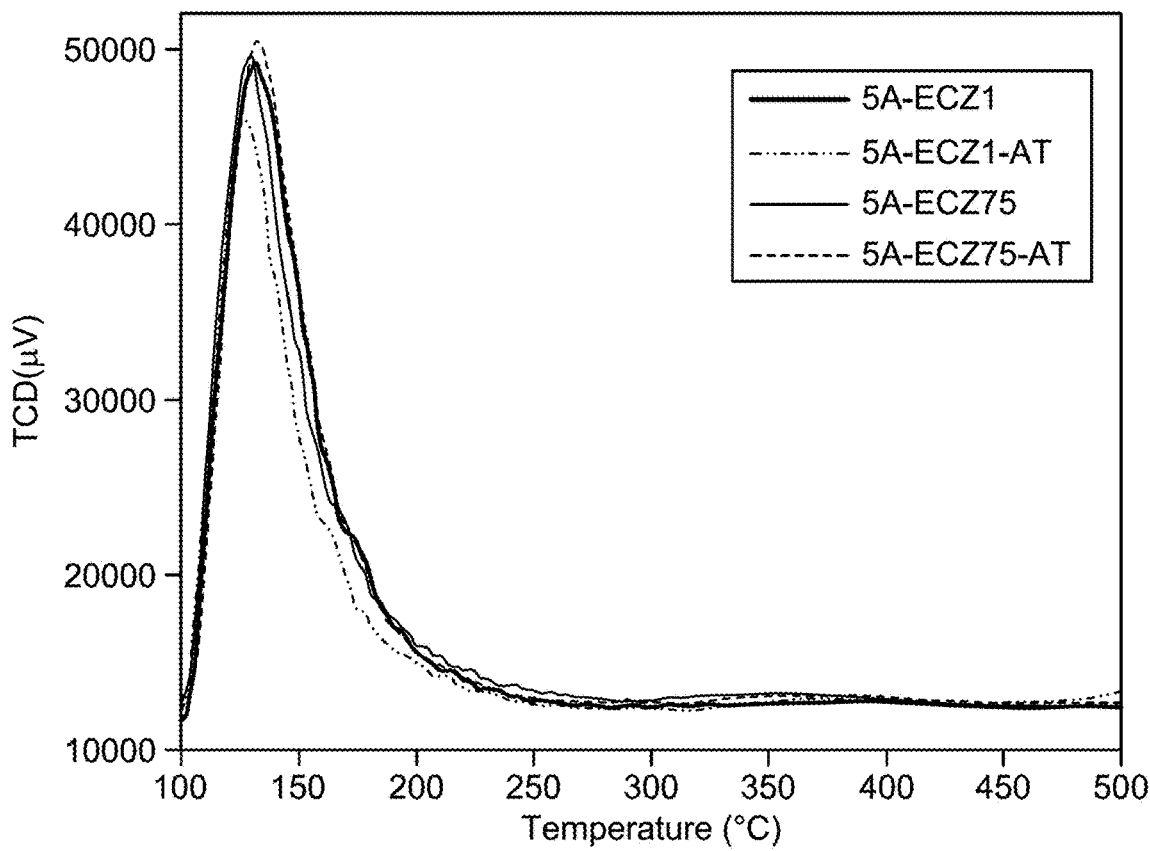
FIG. 3 shows a plot displaying a comparison of temperature-programmed desorption of ammonia ($NH_3$-TPD) profile of adsorbent materials, according to certain embodiments.

Example 5: NH₃-Temperature Programmed Desorption (TPD) Analysis of Adsorbent Materials NH₃-TPD measurement was performed to measure the acidity of adsorbent materials. The results of the total acidity of adsorbent materials are summarized in Table 4. As can be seen the total acidity of both the adsorbent materials i.e., 5A-ECZ1 and 5A-ECZ75 decreased after alkali treatment, mainly due to the suppression of weak acid sites in the temperature region of about 100-250° C., as depicted in FIG. 3.

TABLE 4

Total acidity of adsorbent materials.

| Adsorbent Material | Total Acidity (mmol/g) |
|---|---|
| 5A-ECZ1 | 0.088 |
| 5A-ECZ1-AT | 0.086 |
| 5A-ECZ75 | 0.1005 |
| 5A-ECZ75-AT | 0.096 |

Example 6: Performance Evaluation of Adsorbent Materials for Separation of 1-Butene The performance evaluation of adsorbent materials was carried out by measuring breakthrough point using the adsorption column flow system (ACFS). C4 raffinate gas was purchased and used in ACFS to determine the breakthrough point. The composition of C4 raffinate gas is shown in Table 5. The performance of adsorbent materials was examined for the separation of 1-butene from the C4 raffinate gas. Adsorption experiments were conducted in a fixed bed stainless steel column (dimensions: ID=9 mm; Length=300 mm) reactor using 2 g of the adsorbent materials at a flow rate of 45 mL/min, 30° C., and 1 bar. The adsorbent materials were in powder form and were pelletized, and the pellets passing through mesh 45 (1.00 mm) and retained on mesh 35 (0.50 mm) were taken for conducting sorption experiments in ACFS. An online gas chromatograph (GC) was assembled to determine the breakthrough curves. Results of the adsorption behavior study of 1-butene over different adsorbent materials using ACFS are summarized in Table 6.

TABLE 5

Composition of C4 raffinate gas.

| C4 raffinate gas component | Wt. % |
|---|---|
| iso-Butane | 0.20 |
| iso-Butene | 3.2 |
| 1-Butene | 6.5 |
| N₂ | 90.1 |
| Total | 100 |

TABLE 6

Results of adsorption behavior of 1-butene over different adsorbent materials.

| Adsorbents | Breakthrough Time (min) | cis-2-Butene | trans-2-Butene |
|---|---|---|---|
| 5A-ECZ1 | 70 | Not detected | <0.1% |
| 5A-ECZ1-AT | 120 | Not detected | Not detected |
| 5A-ECZ75 | 120 | 0.6% | Not detected |
| 5A-ECZ75-AT | 180 | Not detected | Not detected |

Referring now to FIG. 4A, a plot displaying the adsorption behavior of 5A-ECZ1 at 30° C. and 1.0 bar pressure of C4 raffinate gas, wherein Ads, T, and P are the amount of adsorbent material, temperature, and pressure, respectively. It was observed that 5A-ECZ1 adsorb 1-butene with 99% selectivity and rejects the other two components (iso-butene/iso-butane) almost completely. trans-2-Butene<0.1% was observed at 150° C. after 300 min with a breakthrough time of 70 min.

Referring now to FIG. 4B, a plot displaying the adsorption behavior of 5A-ECZ1-AT at 30° C. and 1.0 bar pressure of C4 raffinate gas, wherein Ads, T, and P are the amount of adsorbent material, temperature, and pressure, respectively. It was observed that 5A-ECZ1-AT exhibits ~100% selectivity towards 1-butene with no formation of trans-2-butene and cis-2-butene during the desorption step. On the other hand, the breakthrough time for 5A-ECZ1-AT was reduced to around 120 minutes. Thus, a high purity 1-butene separation was achieved with 5A-ECZ1-AT.

Referring now to FIG. 4C, a plot displaying the adsorption behavior of 5A-ECZ75 at 30° C. and 1.0 bar pressure of C4 raffinate gas, wherein Ads, T, and P are the amount of adsorbent material, temperature, and pressure, respectively. It was observed that 5A-ECZ75 exhibits 0.6% trans-2 butene production at 150° C. after 200 min, with a breakthrough time of only 120 min. The mild reaction producing trans-2-butene was most likely due to the acidity of the adsorbent.

Referring now to FIG. 4D, a plot displaying the adsorption behavior of 5A-ECZ75-AT at 30° C. and 1.0 bar pressure of C4 raffinate gas, wherein Ads, T, and P are the amount of adsorbent material, temperature, and pressure, respectively. It can be observed that trans-2-butene and cis-2-butene did not form at the desorption step. There was a significant increase in the breakthrough time for 5A-ECZ75-AT to around 180 minutes.

Example 7: Performance of Equilibrium Uptake Capacity of 1-Butene Over Adsorption Materials The equilibrium uptake capacity of 1-butene over adsorption materials was investigated using Intelligent Gravimetric Analyzer (IGA-001), supplied by Hiden Isochema, UK. Approximately 1.2 grams of the sample of the adsorbent material was loaded into a cylindrical micromesh stainless steel sample container to allow for optimum vapor contact. The sample was suspended upright within the IGA reactor tube. The sample was outgassed to a base pressure $<1\times10^{-6}$ mbar for a minimum period of approximately 2 hours at 450° C. The sample reactor was allowed to cool down to atmospheric temperature. The IGA method analyzed real-time gravimetric data to determine kinetic parameters and simultaneously determine equilibrium uptake capacity of 1-butene. Incorporating an ultra-sensitive microbalance, the IGA-001 measures changes in sample mass as a function of temperature and pressure. To begin the 1-butene adsorption test, the chiller was attached to the sample reactor to maintain the sample temperature at 25° C. The sample was then exposed to a controlled pressure of 1000 mbar of 1-butene at 25° C., and the sorption-time curve was recorded until equilibrium was attained. The sorption-time curve was plotted for adsorbents materials at 90 and 950 mbar at 25° C. The results of the equilibrium uptake capacity of adsorbent materials are summarized in Table 7.

TABLE 7

Equilibrium uptake capacity of 1-butene on adsorbent materials

| Material | Equilibrium Uptake Capacity (wt. %) at 25° C. | |
| --- | --- | --- |
|  | 90 mbar | 950 mbar |
| 5A-ECZ1 | 13.0 | 14.4 |
| 5A-ECZ1-AT | 11.6 | 12.6 |
| 5A-ECZ75 | 14.5 | 15.5 |
| 5A-ECZ75-AT | 12.2 | 13.2 |

Referring now to FIG. 5 and FIG. 6, a plot displaying the sorption-time curve for 1-butene at pressures 90 and 950 mbar and at 25° C. for adsorbent material 5A-ECZ1 and 5A-ECZ75, respectively. It was observed that increasing the pressure increases the adsorption capacity. The maximum equilibrium uptake (Eq. uptake) capacity of 5A-ECZ1 and 5A-ECZ75 at 950 mbar and at 25° C. was found to be 14.4% and 15.5%, respectively.

Referring now to FIG. 7 and FIG. 8, a plot displaying the sorption-time curve for 1-butene at pressures 90 and 950 mbar and at 25° C. for adsorbent material 5A-ECZ1-AT and 5A-ECZ75-AT, respectively. The equilibrium uptake (Eq. uptake) capacity of alkali-modified adsorbents 5A-ECZ1-AT and 5A-ECZ75-AT at 950 mbar and at 25° C. was slightly lower compared with the adsorbent materials 5A-ECZ1 and 5A-ECZ75.

Numerous modifications and variations of the present disclosure are possible in light of the above teachings. It is therefore to be understood that within the scope of the appended claims, the invention may be practiced otherwise than as specifically described herein.

The invention claimed is:

1. A process for separating 1-butene from a hydrocarbon-containing gas composition in which the hydrocarbons consist of a mixture of 1-butene, iso-butene and iso-butane, the method comprising:
   introducing the hydrocarbon-containing gas composition to a reactor containing an adsorbent material and passing the hydrocarbon-containing gas composition through the adsorbent material;
   wherein the adsorbent material is at least one selected from the group consisting of a zeolite adsorbent and an alkali-modified zeolite adsorbent, the adsorbent material comprising 43 to 44 wt. % O, 4 to 7 wt. % Na, 16 to 18 wt. % Al, 17 to 18 wt. % Si, 15 to 17 wt. % Ca, and 0.01 to 1 wt. % Fe, each wt. % based on the total weight of the zeolite adsorbent or the alkali-modified zeolite adsorbent as determined by X-ray fluorescence spectrometry (XRF);
   wherein the adsorbent material has a particle size in a range of 0.5 to 1 millimeters (mm), and a pore size in a range of 4 to 12 angstrom (Å);
   adsorbing the 1-butene from the hydrocarbon-containing gas composition onto the adsorbent material to separate the 1-butene from the hydrocarbon-containing gas composition and form a residue gas composition; and
   desorbing the 1-butene by heating the adsorbent material after the adsorbing to form the 1-butene and regenerate the adsorbent material;
   wherein the adsorbent material is at least 99% by weight selective towards 1-butene for adsorption in comparison to iso-butene and iso-butane.

2. The process of claim 1, wherein the hydrocarbon-containing gas composition further comprises an inert carrier gas.

3. The process of claim 1, wherein the hydrocarbon-containing gas composition comprises:
   a hydrocarbon component consisting of:
   3 to 10 wt. % 1-butene;
   1 to 5 wt. % iso-butene; and
   0.05 to 0.5 wt. % iso-butane; and
   $N_2$ as a balance, each wt. % based on a total weight of the hydrocarbon-containing gas composition.

4. The process of claim 1, wherein the reactor is at least one selected from the group consisting of a fixed-bed reactor, a trickle-bed reactor, a moving bed reactor, a rotating bed reactor, a fluidized bed reactor, and a slurry reactor.

5. The process of claim 4, wherein the reactor is the fixed-bed reactor in the form of a cylindrical reactor comprising:
a top portion;
a cylindrical body portion;
a bottom portion;
a housing having an open top and open bottom supportably maintained with the cylindrical body portion;
wherein the adsorbent material is supportably retained within the housing permitting fluid flow therethrough;
at least one propeller agitator is disposed in the bottom portion of the reactor;
wherein the bottom portion is cone shaped or pyramidal;
wherein a plurality of recirculation tubes fluidly connects the bottom portion of the cylindrical reactor with the cylindrical body portion of the cylindrical reactor; and
wherein the reactor has an aspect ratio of length (L) to inner diameter (ID) of 20:1 to 50:1.

6. The process of claim 1, wherein during the introducing and adsorbing, the hydrocarbon-containing gas composition is in contact with the adsorbent material at a flow rate of 10 to 40 milliliters per minute (mL/min) per gram of the adsorbent material at a temperature of about 30 degree Celsius (° C.) and a pressure of about 1 bar.

7. The process of claim 1, wherein the adsorbing is performed at atmospheric pressure and a temperature in a range of 10 to 100° C.

8. The process of claim 1, wherein the adsorbent material is the zeolite adsorbent having:
a specific surface area of 450 to 550 square meters per gram ($m^2 \, g^{-1}$);
a micropore volume ($V_{mic}$) of 0.001 to 0.07 cubic centimeters per gram ($cm^3 \, g^{-1}$); and
a pore size of 4 to 7Å.

9. The process of claim 8, wherein the zeolite adsorbent comprises 43.69 wt. % O, 4.30 wt. % Na, 17.21 wt. % Al, 17.65 wt. % Si, 16.55 wt. % Ca, and 0.60 wt. % Fe, each wt. % based on the total weight of the zeolite adsorbent as determined by X-ray fluorescence spectrometry (XRF).

10. The process of claim 8, wherein the zeolite adsorbent has an equilibrium uptake capacity towards 1-butene from 12 to 20% based on a total weight of the zeolite adsorbent measured at a pressure of 90 to 950 millibars (mbar) and a temperature of about 25° C.

11. The process of claim 1, wherein the adsorbent material is the alkali-modified zeolite adsorbent, and wherein the alkali-modified zeolite adsorbent is at least one selected from the group consisting of a potassium-modified zeolite adsorbent, a sodium-modified zeolite adsorbent, and a calcium-modified zeolite adsorbent.

12. The process of claim 11, wherein the alkali-modified zeolite adsorbent has:
a specific surface area of 330 to 490 $m^2 \, g^{-1}$;
a micropore volume ($V_{mic}$) of 0.05 to 0.3 $cm^3 \, g^{-1}$; and
a pore size of 5 to 12 Å.

13. The process of claim 11, wherein the alkali-modified zeolite adsorbent has an equilibrium uptake capacity towards 1-butene from 10 to 18% based on a total weight of the alkali-modified zeolite adsorbent measured at a pressure of 90 to 950 mbar and a temperature of about 25° C.

14. The process of claim 1, wherein the desorption of 1-butene is performed by heating the adsorbent material after the adsorbing at a temperature of 130 to 170° C.

15. The process of claim 14, wherein the adsorbent material is the alkali-modified zeolite adsorbent, and wherein the 1-butene formed after the desorbing does not contain any degradation product.

16. The process of claim 1, having a 1-butene breakthrough time of 60 to 200 minutes at a flow rate of about 22.5 mL/min of the hydrocarbon-containing gas composition per gram of the adsorbent material at a temperature of about 30° C. and a pressure of about 1 bar.

17. The process of claim 1, wherein the adsorbent material is the alkali-modified zeolite adsorbent, and the method further comprises:
preparing the alkali-modified zeolite adsorbent by:
mixing particles of the zeolite adsorbent in an alkali solution and heating thereby allowing the zeolite adsorbent particles to react with alkali ions in the alkali solution to form a suspension containing an alkali-modified zeolite adsorbent precursor; and
removing the alkali-modified zeolite adsorbent precursor from the suspension by filtering, washing, drying, and calcining at a temperature of 500 to 600° C. to form the alkali-modified zeolite adsorbent:
wherein the alkali solution has a concentration of 0.01 to 5 M.

18. The process of claim 17, wherein the alkali solution comprises at least one alkali salt selected from the group consisting of potassium hydroxide (KOH), sodium hydroxide (NaOH), and calcium hydroxide (Ca(OH) 2).

19. The process of claim 17, wherein the alkali-modified zeolite adsorbent has an alkali content of from 19 to 35 wt. % based on the total weight of the alkali-modified zeolite adsorbent, and a temperature-programmed desorption of ammonia ($NH_3$-TPD) of 0.05 to 0.1 mmol/g.

20. The process of claim 1, further comprising:
forming trans-2-butene and cis-2-butene, during the desorbing, in an amount of less than 1 wt. % based on a total weight of hydrocarbons adsorbed on the adsorbent material.

* * * * *